(12) United States Patent
Kwag et al.

(10) Patent No.: US 8,604,749 B2
(45) Date of Patent: Dec. 10, 2013

(54) BATTERY PACK

(75) Inventors: No-Hyun Kwag, Yongin-si (KR);
Kyung-Won Seo, Yongin-si (KR);
Watson Doh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 301 days.

(21) Appl. No.: 12/973,684

(22) Filed: Dec. 20, 2010

(65) Prior Publication Data

US 2011/0279086 A1   Nov. 17, 2011

(30) Foreign Application Priority Data

May 13, 2010 (KR) ........................ 10-2010-0045044

(51) Int. Cl.
*H02J 7/00* (2006.01)
(52) U.S. Cl.
USPC ............ 320/106; 320/112; 320/114; 320/128
(58) Field of Classification Search
USPC .................................. 320/106, 112, 114, 128
See application file for complete search history.

(56) References Cited

U.S. PATENT DOCUMENTS

| | | | |
|---|---|---|---|
| 6,347,958 B1 * | 2/2002 | Tsai | ............................ 439/488 |
| 2006/0035142 A1 | 2/2006 | Chung et al. | |
| 2007/0152631 A1 * | 7/2007 | Seo | ................................ 320/112 |
| 2009/0258285 A1 * | 10/2009 | Kim | ................................ 429/97 |
| 2010/0323226 A1 * | 12/2010 | Kim | ................................ 429/7 |

FOREIGN PATENT DOCUMENTS

| | | |
|---|---|---|
| KR | 10-2006-0049430 A | 5/2006 |
| KR | 10-2007-0035877 | 4/2007 |
| KR | 10-2007-0035877 A | 4/2007 |
| KR | 10-2007-0071253 | 7/2007 |
| KR | 10-0778407 B1 | 11/2007 |
| KR | 10-2008-0025863 A | 3/2008 |
| KR | 10-2009-0049184 | 5/2009 |

OTHER PUBLICATIONS

KIPO Notice of Allowance dated Sep. 20, 2011, for priority application KR 10-2010-0045044, 5 pages.

* cited by examiner

*Primary Examiner* — M'Baye Diao
(74) *Attorney, Agent, or Firm* — Christie, Parker & Hale, LLP

(57) ABSTRACT

A battery pack includes a plurality of batteries; a circuit unit for controlling charging and discharging operations of the plurality of batteries; a case for containing the plurality of batteries and the circuit unit, and comprising an assembly of at least two sub-cases; and a submersion checking unit formed on a coupling portion between the at least two sub-cases. By using the battery pack, it is possible to rapidly cope with the submersion by easily checking the submersion of the battery pack, and to easily find the cause of functional deterioration or a malfunction.

15 Claims, 7 Drawing Sheets

BATTERY PACK

CROSS-REFERENCE TO RELATED APPLICATION

This application claims priority to and the benefit of Korean Patent Application No. 10-2010-0045044, filed on May 13, 2010, in the Korean Intellectual Property Office, the disclosure of which is incorporated herein in its entirety by reference.

BACKGROUND

1. Field

One or more embodiments of the present invention relate to a battery pack.

2. Description of Related Art

There is an increasing demand for using a secondary battery as an energy source according to technology development and an increase of usage thereof with respect to mobile devices. According to types of external devices to which secondary batteries are applied, the secondary batteries may be used in the form of a single battery or a battery pack that is a single unit formed by electrically connecting a plurality of batteries.

A small device, for example, a mobile phone may operate for a particular time period by using an output and capacity of a single battery. However, medium or large mobile devices, for example, a notebook computer, a camcorder, a motor bicycle, a motor scooter, an electric vehicle, a hybrid electric vehicle, and the like, which demand high power consumption, long-term operation, and high power operation, may use a battery pack due to their high output and capacity requirements. Additionally, it is possible to increase an output voltage or an output current of the battery pack by increasing the number of batteries included therein.

SUMMARY

One or more embodiments of the present invention include a battery pack having a submersion checking function in view of deterioration and decreased durability of the battery pack when water penetrates the battery pack.

According to one or more embodiments of the present invention, a battery pack includes a plurality of batteries; a circuit unit for controlling charging and discharging of the batteries; a case containing the batteries and the circuit unit, the case comprising an assembly of at least two sub-cases; and a submersion checking unit between the at least two sub-cases.

In one embodiment, the case comprises an assembly of three sub-cases. For example, the case may include a pair of holder cases coupled together, wherein the batteries are between the pair of holder cases; a first case coupled to a first portion of the pair of holder cases; and a second case coupled to a second portion of the holder cases. In one embodiment, the submersion checking unit is located between a first coupling surface located on a first sub-case of the at least two sub-cases and a second coupling surface located on a second sub-case of the least two sub-cases, wherein the first and second coupling surfaces contact each other. Further, the submersion checking unit may be embedded between the first and second coupling surfaces such that the submersion checking unit is not externally exposed.

In one embodiment, the submersion checking unit is formed on a plurality of locations spaced along the first and second coupling surfaces or is subsequently formed along the first and second coupling surfaces.

In one embodiment, a transparent window is in the case that provides a view of the submersion checking unit. Further, in one embodiment, the case comprises a first sub-case, a second sub-case, and a third sub-case that are stacked together, and wherein the submersion checking unit comprises a first submersion checking unit located between a first coupling surface located on the first sub-case contacting a second coupling surface located on the second sub-case, and a second submersion checking unit located between a third coupling surface located on the second sub-case contacting a fourth coupling surface located on the third sub-case.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings.

Figure 1:
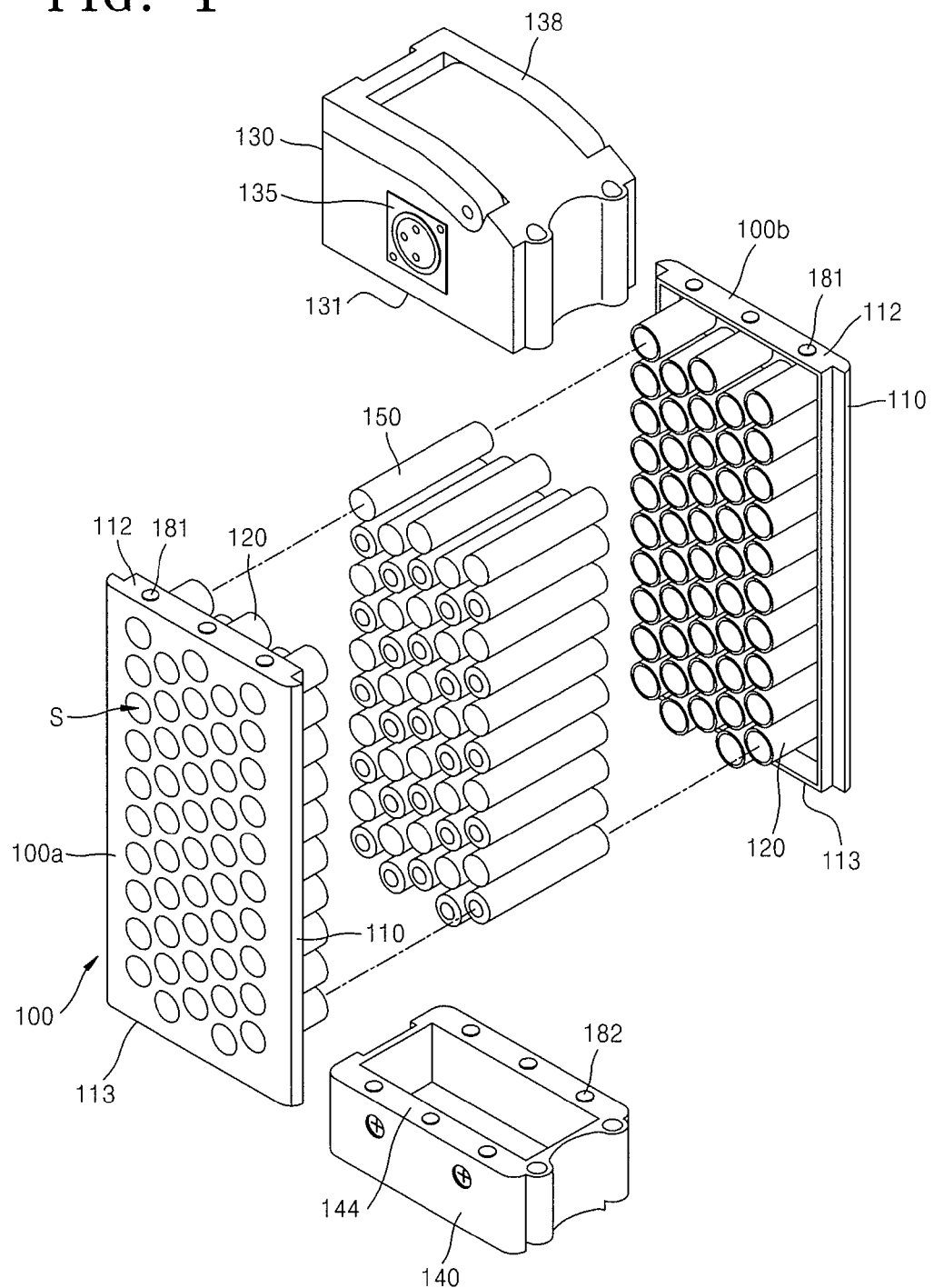
FIG. 1 is an exploded perspective view of a battery pack according to an embodiment of the present invention.

FIG. 1 is an exploded perspective view of a battery pack according to an embodiment of the present invention. The battery pack includes a plurality of batteries 150, and cases 100, 130, and 140 having a circuit configuration for controlling charging and discharging of the batteries 150.

In the present embodiment, the cases 100, 130, and 140 are respectively a pair of holder cases 100 facing each other with the batteries 150 located therebetween, and an upper case 130 and a lower case 140 that are assembled above and below the holder cases 100.

The holder cases 100 may be shaped to be substantially symmetrical to each other, and may be assembled such that the batteries 150 are located therebetween. The holder cases 100 may be first and second holder cases 100a and 100b that correspond to assembly positions of the batteries 150 and that are symmetrical to each other. Additionally, coupling parts of the holder cases 100 may have complementary forms or shapes so as to be coupled to each other.

The upper case 130 may include a battery management system (BMS) that monitors status information regarding a voltage, a current, a temperature, or the like, of each battery 150 and controls charging and discharging of each battery 150 so as to smoothly operate the batteries 150. Also, a transmission line for the status information and a control signal of each battery 150 may be arranged in the upper case 130 so as to relay signal transmission between each battery 150 and the BMS. Discharged power from the battery pack or charging power to the battery pack is delivered via the BMS. In order to protect the batteries 150, the BMS may perform an overcharging resistance function, an overdischarging resistance function, an overcurrent resistance function, an overheating resistance function, a cell balancing function, or the like.

The upper case 130 may have a charging connector 135 for connecting the battery pack to an external power supply unit. Charging power that is input via the charging connector 135 may be supplied to each battery 150 via a charging circuit. Also, a handgrip unit 138 may be arranged in the upper case 130 to allow a user to conveniently grip the battery pack when the battery pack is to be detached from a mounting target (e.g., a motor bicycle or the like) or when the battery pack is to be carried.

Figure 2:
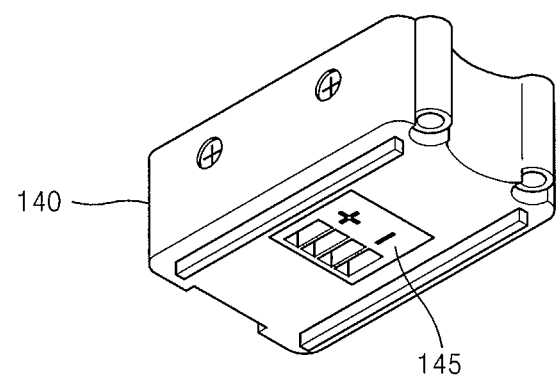
FIG. 2 is a perspective view of a lower case of the battery pack of FIG. 1.

As illustrated in FIG. 2, the lower case 140 may have a discharging connector 145 for connecting to an external load. Also, a boosting circuit may be located in the lower case 140 to adjust a voltage discharged from the batteries 150 into a voltage to be supplied to the external load.

The battery pack according to the present embodiment is formed of an assembly of three cases 100, 130, and 140, and includes a triple-assembly type case that may be divided into three blocks. For example, the cases 100, 130, and 140 include the holder cases 100 having the batteries 150, and the upper case 130 and the lower case 140 assembled, respectively, above and below the holder cases 100. Submersion checking units 181 and 182 are arranged in coupling parts between the cases 100, 130, and 140. For example, the cases 100, 130, and 140 may be assembled with each other via second, third, first, and fourth coupling surfaces 112, 113, 131, and 144. The first and second coupling surfaces 131 and 112 face each other and are on the upper case 130 and on the holder cases 100, respectively, and the third and fourth coupling surfaces 113 and 144 face each other and are between the lower case 140 and the holder cases 100, respectively. For example, the first and second coupling surfaces 131 and 112 correspond to an interface between the upper case 130 and the holder cases 100, and the third and fourth coupling surfaces 113 and 144 correspond to an interface between the lower case 140 and the holder cases 100.

The submersion checking units 181 and 182 may be a first submersion checking unit 181 located between the first and second coupling surfaces 131 and 112, and a second submersion checking unit 182 located between the third and fourth coupling surfaces 113 and 144. The first through fourth coupling surfaces 131, 112, 113, and 144 may be substantially flat. When the first submersion checking unit 181 is arranged on the second coupling surface 112, and the second submersion checking unit 182 is arranged on the fourth coupling surface 144, the upper case 130 and the lower case 140 may be vertically assembled to each other by having the holder cases 100 located therebetween.

Figure 3:
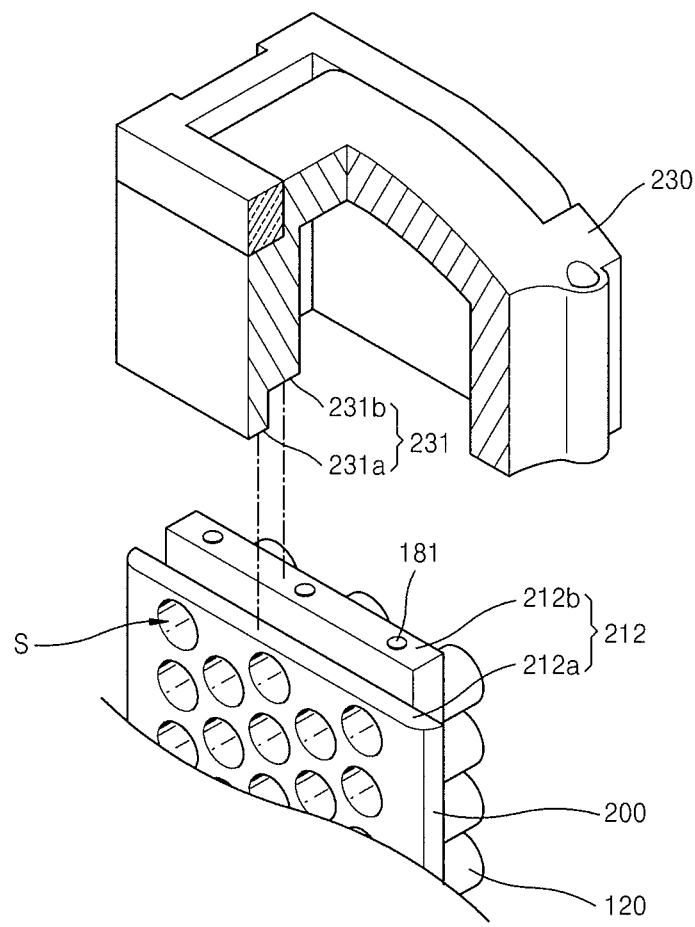
FIG. 3 is an exploded perspective view of a portion of a battery pack according to another embodiment of the present invention.

As illustrated in FIG. 1, the first through fourth coupling surfaces 131, 112, 113, and 144 may be substantially flat. However, in another example, as illustrated in FIG. 3, second and first coupling surfaces 212 and 231 may have a stepped-shape to be engaged with each other for improved water-resistance between a holder case 200 and an upper case 230 or for improved coupling between the cases 200 and 230. For example, the second coupling surface 212 of the holder case 200 is formed of an external portion 212a and an internal portion 212b, wherein the internal portion 212b may be projected with respect to the external portion 212a. As such, the first coupling surface 231 of the upper case 230, which is an opposite coupling surface, is formed of an external portion 231a and an internal portion 231b, wherein the external portion 231a may be projected with respect to the internal portion 231b, so that the coupling surfaces 212 and 231 are complementary to each other.

The first submersion checking unit 181 may be randomly arranged between the first coupling surface 212 of the holder case 200 and the second coupling surface 231 of the upper case 230. For example, the first submersion checking unit 181 may be arranged between the internal portions 212b and 231b of the first and second coupling surfaces 212 and 231 so as to be spaced from water flowing on the cases 200 and 230.

Referring to FIG. 1, any of various well known coupling methods may be applied to couple the cases 100, 130, and 140. For example, the cases 100, 130, and 140 may be coupled to each other by screw coupling, that is, by using mechanical couplers having complementary shapes so as to be coupled to each other, or by one of various mechanical coupling methods.

Figure 4:
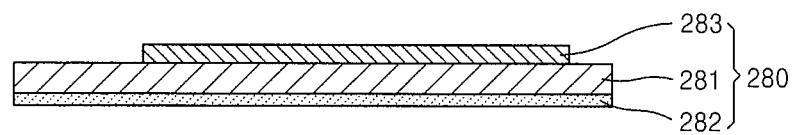
FIG. 4 is a cross-sectional view of a submersion checking unit according to an embodiment of the present invention.

The submersion checking units 181 and 182 are arranged in the coupling parts between the cases 100, 130, and 140. The submersion checking units 181 and 182 may be arranged by directly spraying a water-soluble ink on the coupling surfaces 112, 113, 131, and 144 of the cases 100, 130, and 140. FIG. 4 illustrates an embodiment of the submersion checking units 181 and 182. Referring to FIG. 4, a submersion checking unit 280 may have a structure including an adhesive layer 282 formed on a first surface and a matrix material 281 having a water-soluble ink 283 coated thereon formed on a second surface. For example, the matrix material 281 may include a resin material such as polyethylene terephthalate (PET) resin.

As illustrated in FIG. 1, the submersion checking units 181 and 182 may be adhered to the coupling surfaces 112, 113, 131, and 144 of the cases 100, 130, and 140. When the submersion checking units 181 and 182 are exposed to water, the water-soluble ink is spread so that it is possible to check whether submersion has occurred. In addition, the submersion checking units 181 and 182 may include a discoloration material that may change color when exposed to water and therefore provide an indication of submersion of the battery pack.

The submersion checking units 181 and 182 may be formed on a plurality of positions on the coupling surfaces 112, 113, 131, and 144 of the cases 100, 130, and 140. In another example, the submersion checking units 181 and 182 may be subsequently formed in a longitudinal direction along the coupling surfaces 112, 113, 131, and 144 of the cases 100, 130, and 140. For example, the first and second coupling surfaces 131 and 112 of the battery pack are arranged on the coupling part between the upper case 130 and the holder case 100, and the third and fourth coupling surfaces 113 and 144 are arranged on the coupling part between the lower case 140 and the holder cases 100.

In one embodiment, the submersion checking units 181 and 182 are respectively buried or embedded between the first and second coupling surfaces 131 and 112 and between the third and fourth coupling surfaces 113 and 144, so as not to be externally exposed when the battery pack is assembled. Accordingly, it is possible to prevent water drops on the cases 100, 130, and 140, rather than direct submersion, from changing indicators of the submersion checking units 181 and 182 that indicate whether the submersion checking units 181 and 182 are submerged. Because the battery pack is water-resistant against rainy weather, and water drops on the cases 100, 130, and 140 do not contact the submersion checking units 181 and 182, the indicators are not changed due to rain or other minimal contact with water. However, when the battery pack is submerged in water, the indicators of the submersion checking units 181 and 182 are selectively changed.

Figure 5:
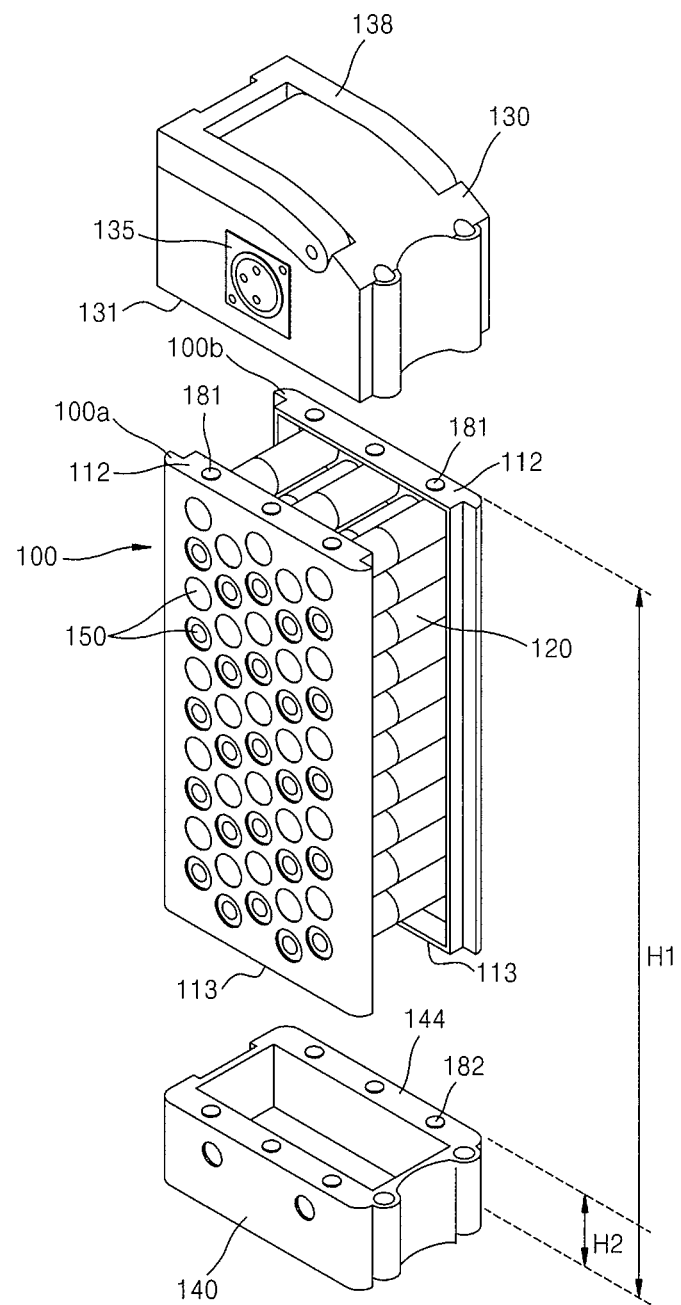
FIG. 5 illustrates an arrangement of first and second submersion checking units of the battery pack of FIG. 1.

Referring to FIG. 5, the coupling surfaces 112, 113, 131, and 144 of the cases 100, 130, and 140 include the first and second coupling surfaces 131 and 112, as a pair, and the third and fourth coupling surfaces 113 and 144, as a pair, at different levels H1 and H2. For example, when the cases 100, 130, and 140 are assembled, the pair of the first and second coupling surfaces 131 and 112 are formed at a first height H1 measured from a bottom of the battery pack, and the pair of the third and fourth coupling surfaces 113 and 144 are formed at a second height H2 measured from the bottom of the battery pack. Accordingly, when the battery pack in its upright position is submerged in water, if the battery pack is submerged to a level that is greater than the first height H1, the indicators of the submersion checking units 181 and 182 that are arranged between the coupling surfaces 112, 113, 131, and 144 are all changed. If the battery pack is submerged to a level that is greater than the second height H2 but is lower than the first height H1, only the indicator of the second submersion checking unit 182 between the third and fourth coupling surfaces 113 and 144 is changed. By locating the submersion checking units 181 and 182 at different positions, a submersion status of the battery pack may be checked.

Figure 6:
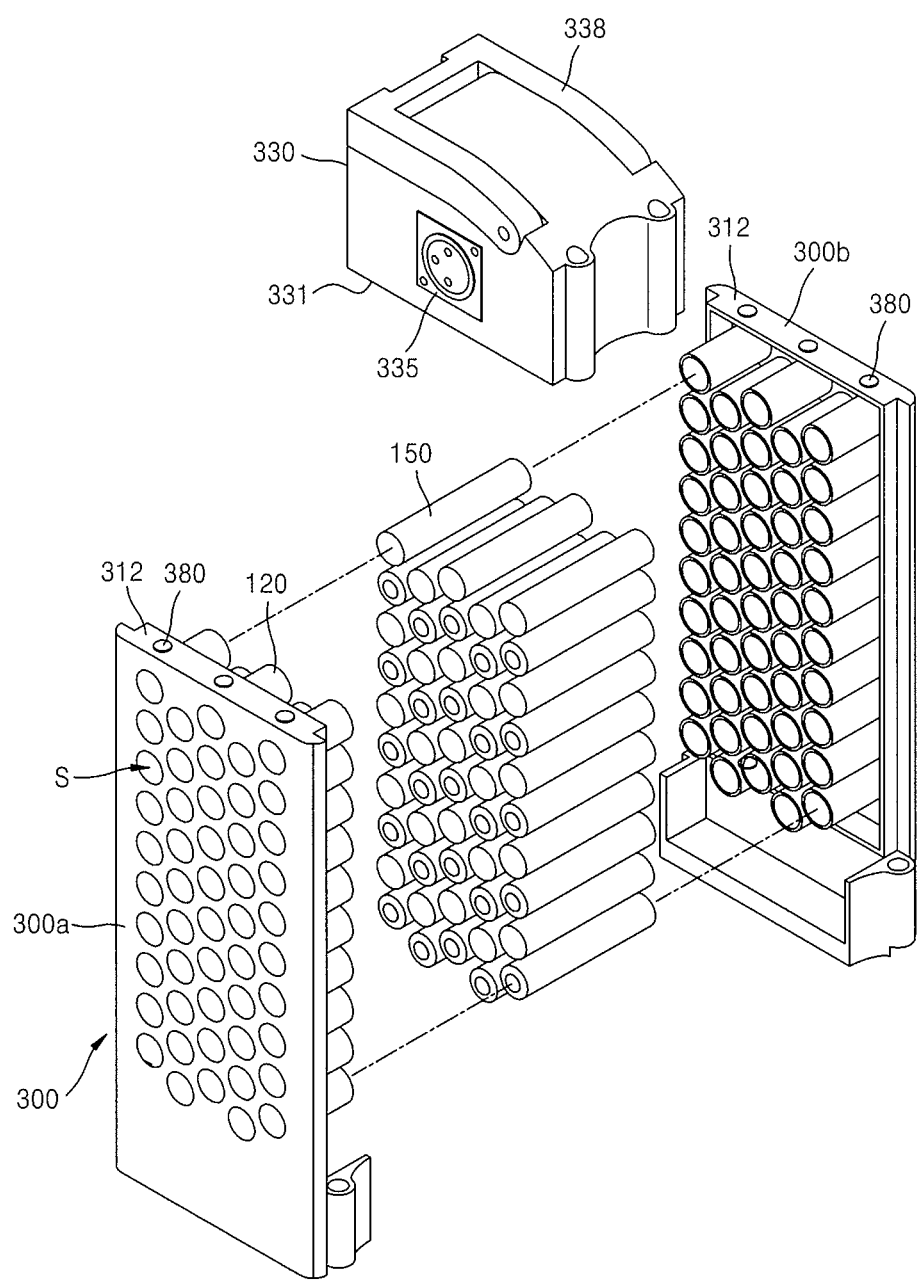
FIG. 6 is an exploded perspective view of a battery pack according to another embodiment of the present invention.

FIG. 6 is an exploded perspective view of a battery pack according to another embodiment of the present invention. Referring to FIG. 6, the battery pack includes a plurality of batteries 150, and cases 300 and 330 having a circuit configuration for controlling charging and discharging of the batteries 150. In the present embodiment, the cases 300 and 330 are a pair of holder cases 300 facing each other with the batteries 150 located therebetween, and a cover case 330 that is assembled to the pair of holder cases 300. The pair of holder cases 300 may be first and second holder cases 300a and 300b that are coupled to each other while facing each other.

The cover case 330 may include a BMS that monitors status information regarding a voltage, a current, a temperature or the like of each battery 150 and controls charging and discharging operations of each battery 150. Also, the cover case 330 may have a charging-discharging connector 335 in which a charging connector for connecting the battery pack to an external power supply unit and a discharging connector for connecting the battery pack to an external load are integrated. As will be appreciated, the charging connector and the discharging connector may be separate components. Also, a handgrip unit 338 may be arranged in the cover case 330 to allow a user to conveniently grip the battery pack when the battery pack is to be detached or carried.

The battery pack according to the present embodiment is formed of an assembly of two cases 300 and 330, and includes a double-assembly type case that may be divided into two blocks. For example, the cases 300 and 330 include the holder cases 300 having the batteries 150, and the cover case 330.

A submersion checking unit 380 is arranged in a coupling part between the cases 300 and 330. For example, the cases 300 and 330 may be assembled with each other via first and second coupling surfaces 331 and 312 that face and contact each other. The first and second coupling surfaces 331 and 312 correspond to an interface between the cover case 330 and the holder cases 300. For example, the cover case 330 may be assembled on the holder cases 300, and thus may form an upper part of a case. In another example, the cover case 330 may be assembled below the holder cases 300, and thus may form a lower part of a case.

The cases 300 and 330 may be assembled by any one of various well known coupling methods. For example, the cases 300 and 330 may be coupled to each other by screw coupling, that is, by using mechanical couplers having complementary shapes so as to be coupled with each other, or by other well-known mechanical coupling methods.

The submersion checking unit 380 may be located between the first and second coupling surfaces 331 and 312 of the cases 300 and 330. For example, the submersion checking unit 380 may be arranged on the second coupling surface 312 of each holder case 300, and the cover case 330 may be assembled thereon.

The submersion checking unit 380 may be formed by directly coating a water-soluble ink onto the first and second coupling surfaces 331 and 312 of the cases 300 and 330, or by adhering a resin material having a water-soluble ink coated thereon to the first and second coupling surfaces 331 and 312 of the cases 300 and 330. Also, the submersion checking unit 380 may include a discoloration material that may change color when exposed to water.

Figure 7:
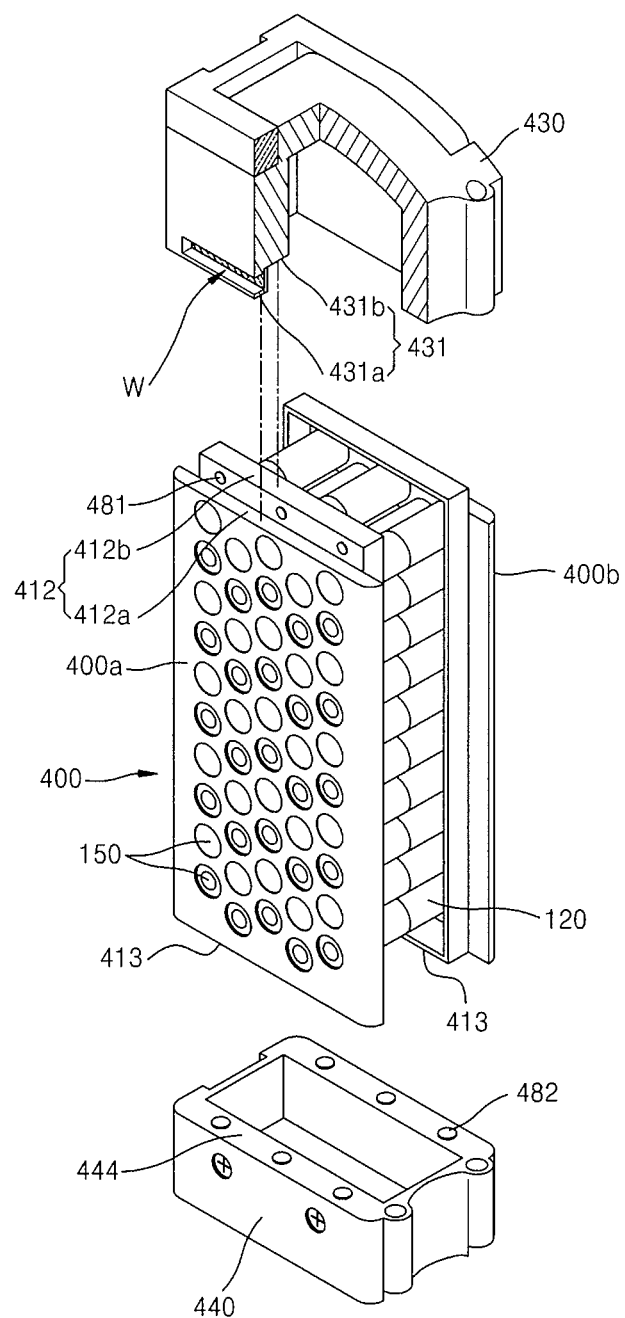
FIG. 7 is an exploded perspective view of a battery pack according to yet another embodiment of the present invention.

FIG. 7 is an exploded perspective view of a battery pack according to another embodiment of the present invention. Referring to FIG. 7, the battery pack includes a plurality of batteries 150, and cases 400, 430, and 440 for containing the batteries 150. In addition to the batteries 150, the cases 400, 430, and 440 may also contain a BMS (not shown) for controlling charging and discharging operations of the battery pack.

The cases 400, 430, and 440 are a pair of holder cases 400 for defining assembling positions of the batteries 150, and upper and lower cases 430 and 440 that are assembled to the holder cases 400. The holder cases 400 may be first and second holder cases 400a and 400b that are coupled and that face each other while having the batteries 150 located therebetween.

Submersion checking units 481 and 482 are arranged in coupling parts between the cases 400, 430, and 440. For example, the submersion checking unit 481 is arranged between a first coupling surface 431 of the upper case 430 and a second coupling surface 412 of the holder case 400. In more detail, the second coupling surface 412 of the holder case 400 may have a stepped-shape in which an internal portion 412b is upwardly projected with respect to an external portion 412a, and the submersion checking unit 481 may be adhered on a side surface of the internal portion 412b. Also, the first coupling surface 431 of the upper case 430 assembled on the holder cases 400 has a stepped-shape in which an external portion 431a is further projected with respect to an internal portion 431b. In addition, the external portion 431a of the upper case 430 extends to cover the submersion checking unit 481, and is mounted on the holder cases 400. A transparent window W may be formed in the upper case 430. Via the transparent window W, it is possible to check an indicator of the submersion checking unit 481 that indicates whether the submersion checking unit 481 is submerged, without needing to disassemble the upper case 430 and the holder cases 400.

Another submersion checking unit 482 may be additionally arranged between a third coupling surface 413 of the holder case 400 and a fourth coupling surface 444 of the lower case 440. By locating the submersion checking units 481 and 482 at different positions or locations, a submersion status of the battery pack may be checked.

Figure 8:
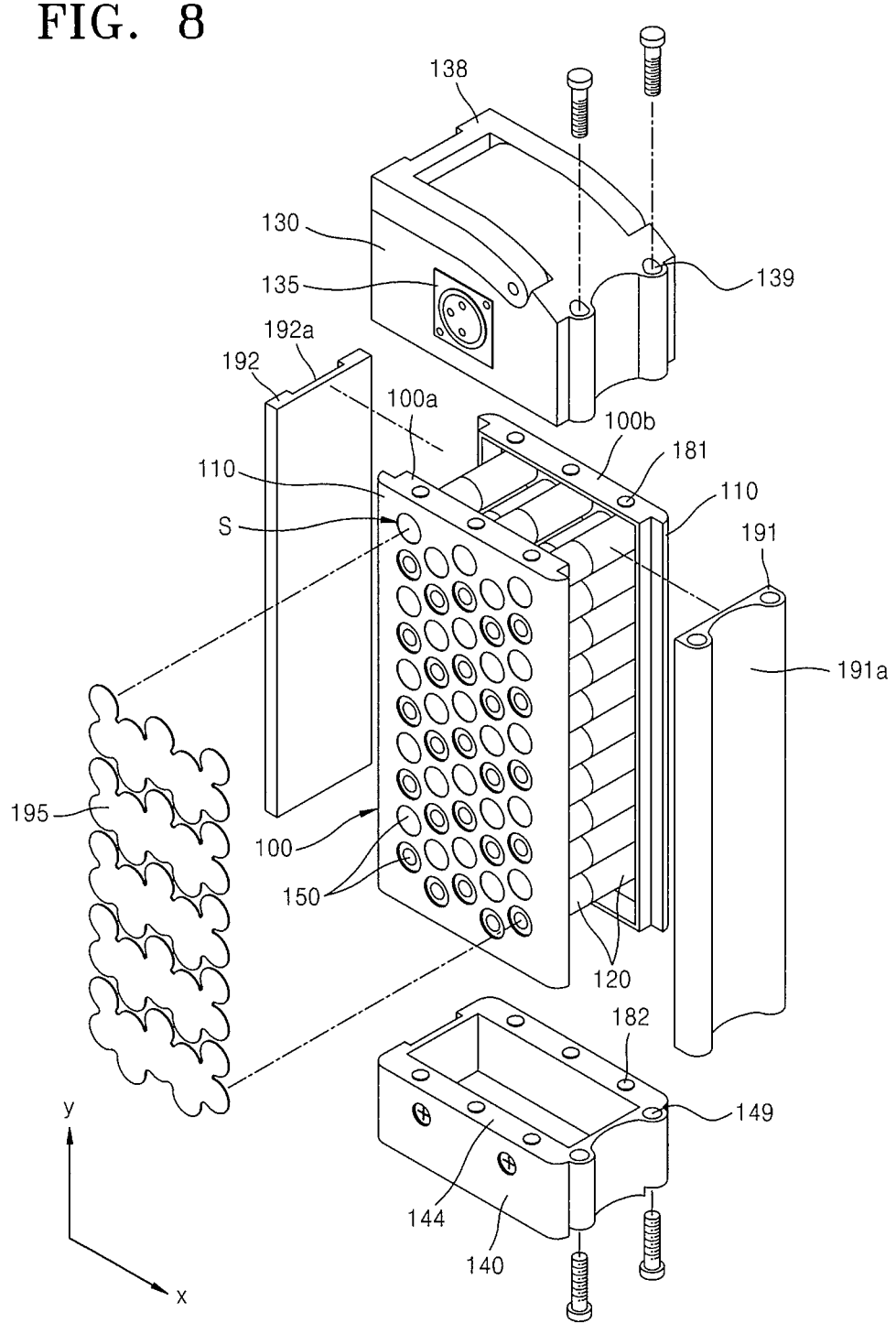
FIG. 8 is an exploded perspective view of a battery pack according to still another embodiment of the present invention.

Hereinafter, arrangement of the batteries 150 included in the holder cases 100 will now be described. Referring to FIG. 8, the holder cases 100 may include the first and second holder cases 100a and 100b as a pair that are located facing each other. A plurality of cell spaces S are formed between the first and second holder cases 100a and 100b of the holder cases 100. The cell spaces S formed in the holder cases 100 may accommodate the batteries 150.

The holder cases 100 include a frame 110 that forms a border of a case, and a plurality of ribs 120 that are integrally formed with the frame 110 and that spatially separate the batteries 150. The ribs 120 define the cell spaces S for having the batteries 150 inserted therein so that the batteries 150 included in the battery pack may be substantially uniformly arranged. Each cell space S may have a hole-shape penetrating the holder cases 100. For example, each rib 120 may provide a cylindrically-shaped supporting surface to surround each battery 150 if the batteries 150 are cylindrically-shaped.

The batteries 150 are arranged in a column direction (Y-axis direction) and a row direction (X-axis direction), and are stacked in the column direction (Y-axis direction). Here, the batteries 150 arranged in an upper row are disposed in valleys between adjacent batteries 150 arranged in a lower row. That is, the upper and lower batteries 150 are stacked in valleys adjacent thereto. Accordingly, it is possible to decrease dead space between the batteries 150, to efficiently arrange the batteries 150, and to intensively arrange the batteries 150 so that an output of the battery pack may be increased while maintaining a small and compact battery pack.

For example, the holder cases 100 may be integrally shaped, and may be formed of a plastic material having an excellent workability or malleability. When the holder cases 100 are formed of a heat-resistant plastic material, it is possible to prevent significant thermal transfer between adjacent batteries 150, and to prevent significant thermal runaway in which adjacent batteries 150 are successively heated in an abnormal operation environment when a particular battery 150 is overheated.

The batteries 150 that are included in the holder cases 100 may include any type of secondary battery that is chargeable and dischargeable. For example, a lithium ion secondary battery that has an excellent output and capacity may be used. Also, a nickel-cadmium secondary battery, a nickel-metal hydride secondary battery, a lithium battery, or the like may be used. A lead plate 195 may be arranged on an external surface of the holder cases 100 to connect the batteries 150 in series or in parallel. The lead plate 195 connects electrodes of ends of the batteries 150 in series or in parallel. For example, the lead plate 195 may connect five batteries 150 as one parallel block, and may connect vertically stacked parallel blocks in series.

Serial or parallel connection of the batteries 150 included in the battery pack, or arrangement or the number of batteries 150 forming a parallel block may vary. Also, the stacked arrangement of the batteries 150 forming the battery pack is not limited to a shape shown in FIG. 8. An insulating lead tape is adhered on an external surface of the lead plate 195 so that the lead plate 195 may be electrically insulated from an external environment.

A mounting structure for mounting the battery pack may be arranged on external surfaces of the battery pack. For example, first and second mounting units 191 and 192 may be assembled to first and second surfaces of the battery pack.

The first mounting unit 191 has an inlet portion 191a that is grooved to be complementary to, for example, a main frame of a bicycle so that the first mounting unit 191 may be closely attached to the main frame. In order to assemble the first mounting unit 191, the upper and lower cases 130 and 140 may have assembling holes 139 and 149 formed therein in a longitudinal direction of the battery pack. The upper case 130 and the first mounting unit 191 may be coupled to each other by a screw member that is screwed to the first mounting unit 191 via the assembling hole 139 of the upper case 130. Similarly, the lower case 140 and the first mounting unit 191 may be coupled to each other by a screw member that is screwed to the first mounting unit 191 via the assembling hole 149 of the lower case 140.

The second mounting unit 192 may have a guide groove 192a used to fix the battery pack to, for example, a body of the bicycle. The guide groove 192a extends along a longitudinal direction of the battery pack. The battery pack may be fixed to the body of the bicycle in such a manner that a frame of the bicycle combined thereto may slide along the guide groove 192a.

The second mounting unit 192 may be assembled to the cases 100, 130, and 140 by one of various well known attachment methods. For example, the second mounting unit 192 may be assembled to the cases 100, 130, and 140 by screw coupling, by using mechanical couplers having complementary shapes so as to be coupled with each other, or by another one of various well-known mechanical coupling methods.

The battery pack according to the embodiments has a case formed of an assembly of at least two sub-cases, and has the submersion checking unit capable of checking and indicating whether coupling parts between the sub-cases are submerged. Accordingly, it is possible to rapidly cope with the submersion by easily checking the submersion of the battery pack, and to easily find the cause of a malfunction.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
   a plurality of batteries;
   a circuit unit for controlling charging and discharging of the batteries;
   a case containing the batteries and the circuit unit, the case comprising an assembly of at least two sub-cases that directly contact each other at respective coupling surfaces; and
   a submersion checking unit between the at least two sub-cases and on at least one of the coupling surfaces.

2. The battery pack of claim 1, wherein the case comprises an assembly of three sub-cases.

3. The battery pack of claim 1, wherein the case comprises:
   a pair of holder cases coupled together, wherein the batteries are between the pair of holder cases;
   a first case coupled to a first portion of the pair of holder cases; and
   a second case coupled to a second portion of the holder cases.

4. The battery pack of claim 1, wherein the submersion checking unit is located between a first coupling surface located on a first sub-case of the at least two sub-cases and a second coupling surface located on a second sub-case of the least two sub-cases, wherein the first and second coupling surfaces contact each other.

5. The battery pack of claim 4, wherein the submersion checking unit is embedded between the first and second coupling surfaces such that the submersion checking unit is not externally exposed.

6. The battery pack of claim 4, wherein the submersion checking unit is formed on a plurality of locations spaced along the first and second coupling surfaces.

7. The battery pack of claim 4, wherein the submersion checking unit extends along the first and second coupling surfaces.

8. The battery pack of claim 4, wherein the first and second coupling surfaces are substantially flat surfaces.

9. The battery pack of claim 4, wherein the first and second coupling surfaces are complementarily stepped to be engaged with each other.

10. The battery pack of claim 1, further comprising a transparent window in the case that provides a view of the submersion checking unit.

11. The battery pack of claim 1, wherein the submersion checking unit comprises a first submersion checking unit and a second submersion checking unit that are located at different distances from a bottom of the case.

12. The battery pack of claim 1, wherein the case comprises a first sub-case, a second sub-case, and a third sub-case that are stacked together, and wherein the submersion checking unit comprises a first submersion checking unit located between a first coupling surface located on the first sub-case and a second coupling surface located on the second sub-case that contact each other, and a second submersion checking unit located between a third coupling surface located on the second sub-case and a fourth coupling surface located on the third sub-case that contact each other.

13. A battery pack comprising:

a plurality of batteries;

a circuit unit for controlling charging and discharging of the batteries;

a case containing the batteries and the circuit unit, the case comprising a first sub-case and a second sub-case;

a submersion checking unit in the case, the submersion checking unit being located between a first coupling surface on the first sub-case and a second coupling surface on the second sub-case, wherein the first and second coupling surfaces directly contact each other; and a transparent window on the case that provides a view of the submersion checking unit.

14. The battery pack of claim 13, wherein the submersion checking unit and the transparent window are formed on the first coupling surface and the second coupling surface, respectively, and wherein the first coupling surface and the second coupling surface face each other.

15. The battery pack of claim 14, wherein the first coupling surface and the second coupling surface are complementarily stepped to be engaged with each other, and wherein the submersion checking unit and the transparent window are located on a stepped portion of the first coupling surface and the second coupling surface.

\* \* \* \* \*